(12) United States Patent
Pindiprolu et al.

(10) Patent No.: US 11,447,681 B2
(45) Date of Patent: Sep. 20, 2022

(54) AQUEOUS SILICA DISPERSION

(71) Applicant: HALLIBURTON ENERGY SERVICES, INC., Houston, TX (US)

(72) Inventors: Sairam K S Pindiprolu, Pune (IN); Sudhir Maruti Nimane, Pune (IN); Jan Pieter Vijn, Leiden (NL)

(73) Assignee: Halliburton Energy Services, Inc., Houston, TX (US)

( * ) Notice: Subject to any disclaimer, the term of this patent is extended or adjusted under 35 U.S.C. 154(b) by 219 days.

(21) Appl. No.: 16/954,287

(22) PCT Filed: Jul. 30, 2019

(86) PCT No.: PCT/US2019/044176
§ 371 (c)(1),
(2) Date: Jun. 16, 2020

(87) PCT Pub. No.: WO2021/021135
PCT Pub. Date: Feb. 4, 2021

(65) Prior Publication Data
US 2022/0127511 A1   Apr. 28, 2022

(51) Int. Cl.
| | |
|---|---|
| *C09K 8/467* | (2006.01) |
| *C01B 33/141* | (2006.01) |
| *C04B 24/42* | (2006.01) |
| *C04B 28/24* | (2006.01) |
| *E21B 33/14* | (2006.01) |
| *C04B 111/00* | (2006.01) |

(52) U.S. Cl.
CPC .......... *C09K 8/467* (2013.01); *C01B 33/1417* (2013.01); *C04B 24/42* (2013.01); *C04B 28/24* (2013.01); *E21B 33/14* (2013.01); *C01P 2004/61* (2013.01); *C01P 2004/62* (2013.01); *C04B 2111/00146* (2013.01)

(58) Field of Classification Search
None
See application file for complete search history.

(56) References Cited

U.S. PATENT DOCUMENTS

| | | |
|---|---|---|
| 5,246,624 A | 9/1993 | Miller et al. |
| 5,472,501 A | 12/1995 | Dastol |
| 8,309,615 B2 | 11/2012 | Hoefler |
| 2006/0178452 A1* | 8/2006 | Hoefler .................... C08K 3/36 524/492 |

FOREIGN PATENT DOCUMENTS

EP   2598457 B1   3/2016

* cited by examiner

*Primary Examiner* — Jeffrey D Washville
(74) *Attorney, Agent, or Firm* — McAfee & Taft

(57) ABSTRACT

Methods of forming an aqueous silica suspension are provided. The methods include admixing water, an organic acid, a silica powder, and a siliconate under certain conditions. The silica powder includes undensified silica powder in an amount of at least about 50% by weight and has a specific gravity in the range of from about 2.1 to about 2.5, a bulk density in the range of from about 12 lb/ft3 to about 40 lb/ft3, and a water requirement of from about 80 to about 250 at a pH in the range of from about 5.5 to about 7.5. Also provided are aqueous silica suspensions, hydraulic cement compositions, and methods of cementing in a well.

16 Claims, 6 Drawing Sheets

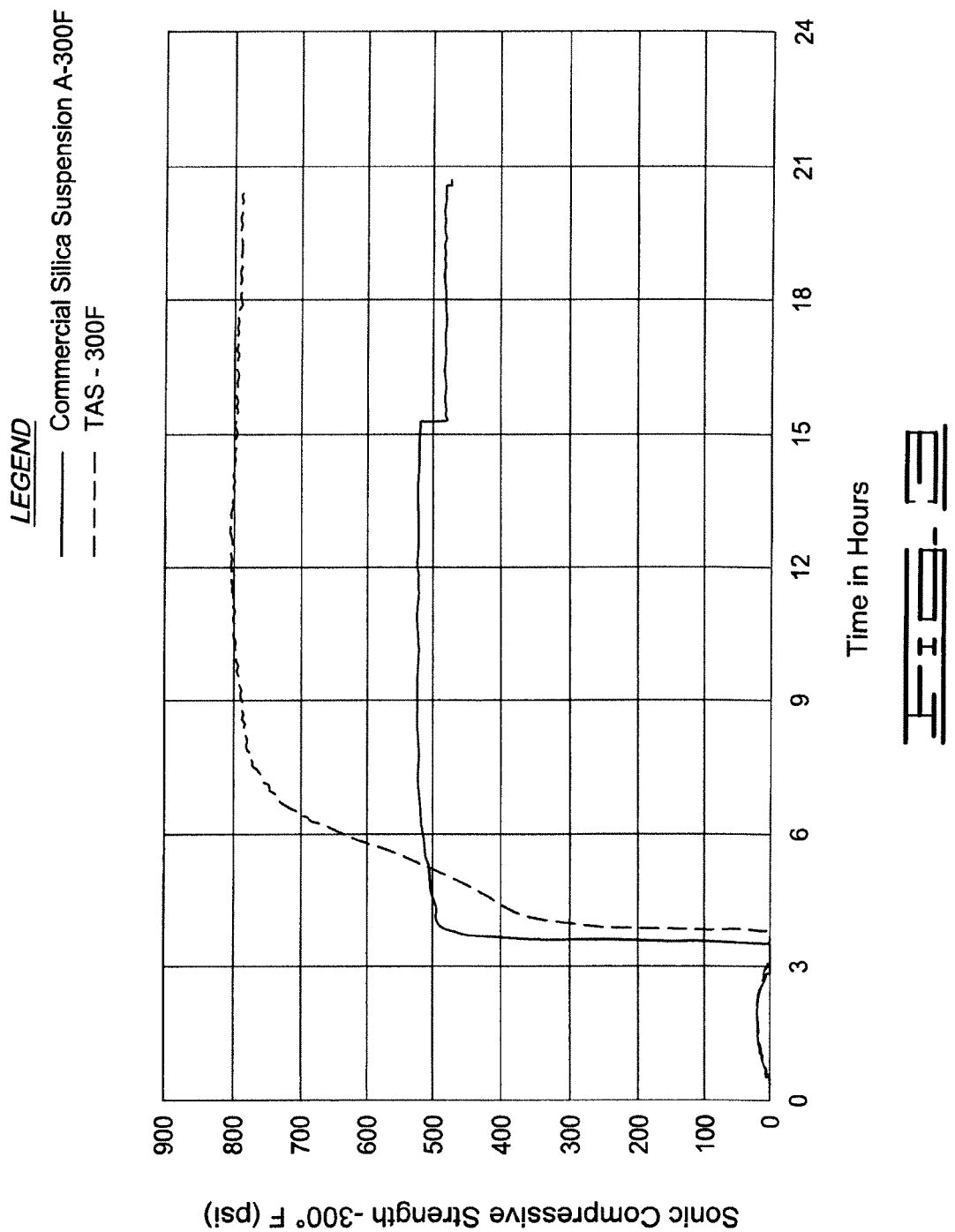

AQUEOUS SILICA DISPERSION

BACKGROUND

Hydraulic cement compositions are commonly utilized in oil, gas and water well completion and remedial operations. A typical hydraulic cement composition is in the form of a slurry that includes hydraulic cement, water, and one or more additives that affect one or more properties of the slurry such as the thickening time, compressive strength, set time, and rheology. Hydraulic cement compositions are used in both primary cementing operations and remedial or secondary cementing operations.

In a primary cementing operation, a hydraulic cement composition is pumped into the annular space between the wall of a wellbore and the exterior of a string of pipe such as a casing or liner disposed in the wellbore. The cement composition is allowed to set in the annular space thereby forming an annular sheath of hardened, substantially impermeable cement therein. The cement sheath physically supports and positions the pipe string in the wellbore and bonds the exterior surface of the pipe string to the wall of the wellbore, whereby undesirable migration of fluids between zones or formations penetrated by the wellbore is prevented.

For example, remedial or secondary cementing operations (collectively "remedial cementing operations") can be carried out to address a problem associated with the cement, casing, or well in general, including problems that develop over time. Examples of remedial cementing operations include squeeze cementing and plug cementing. For example, in a squeeze cement job, a cement composition is forced through holes or splits in the casing to repair a primary cement job or a well problem. In a plug cement job, a cement plug is installed to plug a highly permeable zone or fracture in the well, plug cracks or holes in the casing, or address other problems associated with the casing or well.

Once pumped into place, the cement composition must generally be allowed to develop sufficient mechanical strength or "set" before well operations can be resumed. If operations are resumed before the cement composition has set, the structural integrity of the cement can be compromised. In most applications, the time that it takes for a cement composition to set can constitute costly well downtime. This downtime can range from a few hours to several days, depending on various factors including the difficulty of the cement job.

Silica dispersions, such as silica suspensions, are an important additive in many cement slurries. For example, silica suspensions enhance strength and control free water. Silica suspensions are typically manufactured at a manufacturing facility, stocked at intermediate location for a period of time, and then transported to a wellsite as needed.

Unfortunately, commercially available silica suspensions can experience phase separation, agglomeration, and/or sedimentation with time. As a result, as time passes by, the strength imparted by a silica suspension to a cement slurry can be significantly diminished. The effects of such diminished strength are more prominent at low temperature conditions, which are the very conditions under which strength enhancers are often most needed. If a commercially available silica suspension sits in warehouse for too long or takes too long to ship, phase separation, agglomeration, and/or sedimentation can cause problems.

Another problem associated with commercially available silica suspensions is the difficulty in warehousing and transporting the suspensions. Commercially available silica suspensions are typically 50% active products. Due to the volume of water in such suspensions, the suspensions require large containers that can take up needed space.

Thus, there is a need for silica suspensions that do not have the problems associated with typical commercially available silica suspensions.

BRIEF DESCRIPTION OF THE DRAWINGS

The drawings included with this application illustrate certain aspects of the embodiments described herein. However, the drawings should not be viewed as an exclusive embodiment. The subject matter disclosed herein is capable of considerable modifications, alterations, combinations, and equivalents in form and function, as will be evident to those skilled in the art with the benefit of this disclosure.

FIG. 3 is a graph showing the sonic compressive strength (psi) of both a hydraulic cement composition prepared with a tailored aqueous silica suspension prepared by a method of forming an aqueous silica suspension disclosed herein ("TAS"), and a hydraulic cement composition prepared with a commercially available aqueous silica suspension, over time at 300° F.

DETAILED DESCRIPTION

Figure 1:
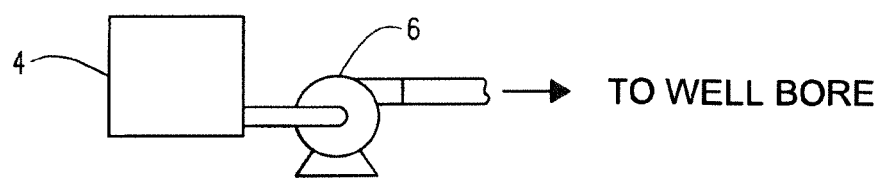
FIG. 1 illustrates a system for preparation and delivery of a cement composition to a wellbore in accordance with aspects of the present disclosure.

The present disclosure may be understood more readily by reference to this detailed description as well as to the examples included herein. For simplicity and clarity of illustration, where appropriate, reference numerals may be repeated among the different figures to indicate corresponding or analogous elements. In addition, numerous specific details are set forth in order to provide a thorough understanding of the examples described herein. However, it will be understood by those of ordinary skill in the art that the examples described herein can be practiced without these specific details. In other instances, methods, procedures and components have not been described in detail so as not to obscure the related relevant feature being described. Also, the description is not to be considered as limiting the scope of the examples described herein. The drawings are not necessarily to scale and the proportions of certain parts have been exaggerated to better illustrate details and features of the present disclosure.

As used herein and in the appended claims, the following terms and phrases have the corresponding definitions set forth below.

A "well" means a wellbore extending into the ground, and any subterranean formation penetrated by the wellbore.

A "well fluid" means any fluid that is associated with a well.

"Well operations" means operations carried out in the wellbore before and/or after a method of cementing is carried out.

The term "cement composition" encompasses pastes (or slurries), mortars, grouts (e.g., oil well cementing grouts), shotcrete, and concrete compositions including a hydraulic cement binder.

The term "set" means an increase in mechanical strength of a hydraulic cement composition sufficient to perform a desired result, such as to restrict movement of an item or impede fluid flow or pressure transfer through a fluid. In most instances, the cement composition may be referred to as set when it has cured to a fully solid composition.

Unless stated otherwise, admixing one component into another component means mixing or dissolving the one component with or in the second component.

Unless stated otherwise, a mixture means a mixture or a solution of two or more components.

The specific gravity, bulk density, and water requirement of the silica powder provided in accordance with the method disclosed herein and of the silica powder of the aqueous silica suspension provided herein are the specific gravity, bulk density, and water requirement of the silica powder before the silica powder is admixed with the other components of the aqueous silica suspension.

The water requirement of a silica powder means the amount of water needed to fully wet 100 grams of the powder and achieve a 10 millimeter vortex in an API approved oilfield cement slurry blender at 12,000 rpm.

A silica powder having a water requirement that falls in a specified range at a pH in a specified range means a silica powder having a water requirement that falls within the specified range when 25 grams of the silica powder is mixed with 50 grams of water to form a 34/66 w/w mixture of the silica powder and water, and the pH of the mixture is in the specified range.

A component that "comprises" or "includes" one or more specified compounds means that the component includes the specified compound(s) alone, or includes the specified compound(s) together with one or more additional compounds.

A component that "consists of" one or more specified compounds means that the component includes only the specified compound(s).

A component that "consists essentially of" one or more specified compounds means that the component consists of the specified compound(s) alone, or consists of the specified compound(s) together with one or more additional compounds that do not materially affect the basic properties of the component.

Whenever a range is disclosed herein, the range includes independently and separately every member of the range extending between any two numbers enumerated within the range. Furthermore, the lowest and highest numbers of any range shall be understood to be included within the range set forth.

In accordance with the present disclosure, methods of forming an aqueous silica suspension are provided. Aqueous silica suspensions that are tailored for particular applications can be prepared. Also provided are aqueous silica suspensions, hydraulic cement compositions for use in a well, and methods of cementing in a well.

Method of Forming an Aqueous Silica Suspension

An example of a method of forming an aqueous silica suspension disclosed herein comprises:

(a) providing water;

(b) providing an organic acid;

(c) providing a silica powder, wherein the silica powder includes undensified silica powder in an amount of at least about 50% by weight, based on the total weight of the silica powder, and has a specific gravity in the range of from of about 2.1 to about 2.5, a bulk density in the range of from about 12 $lb/ft^3$ to about 40 $lb/ft^3$, and a water requirement in the range of about 80 to about 250 at a pH in the range of about 5.5 to about 7.5;

(d) providing a siliconate;

(e) admixing at least a portion of the organic acid with at least a portion of the water to form a mixture, the organic acid being admixed with the water in an amount sufficient to adjust the pH of the mixture to a value in the range of about 1.5 to about 3.5;

(f) after step (e), admixing at least a portion of the silica powder with the mixture; and (g) after step (f), admixing at least a portion of the siliconate with the mixture, the siliconate being admixed with the mixture in an amount sufficient to adjust the pH of the mixture to a value in the range of from about 6.0 to about 6.8.

The water provided in accordance with step (a) of the method can come from a variety of sources. For example, the water can be fresh water. For example, the water can be salt-containing water. Examples of salt-containing water include saltwater, brine (for example, saturated saltwater or produced water), seawater, brackish water, produced water (for example, water produced from a subterranean formation), formation water, treated flowback water, and any combination thereof. For example, at the time the water is provided, the pH of the water can be tested. At this point, the water will typically have a pH in the range of 7.0 to 7.5.

Any suitable organic acid may be provided in step (b). For example, the organic acid provided in accordance with step (b) can comprise an organic acid that is selected from the group consisting of glycolic acid, gluconic acid, tartaric acid, malic acid, itaconic acid, oxalic acid, succinic acid, adipic acid, sulfosalicylic acid, and any combination thereof. For example, the organic acid provided in accordance with step (b) can comprise an organic acid that is selected from the group consisting of oxalic acid, glycolic acid, malic acid, succinic acid, and any combination thereof. For example, the organic acid can be oxalic acid.

For example, while the organic acid is admixed with the water, the resulting mixture can be stirred or otherwise agitated to facilitate the mixing process. The organic acid can be added to the mixture in increments in order to achieve the desired pH. For example, the organic acid admixed with the water to form a mixture in accordance with step (e) can be admixed with the water in an amount sufficient to adjust the pH of the mixture to a range of about 1.7 to about 2.5. For example, the organic acid admixed with the water to form a mixture in accordance with step (e) can be admixed with the water in an amount sufficient to adjust the pH of the mixture to a range of about 1.9 to about 2.1.

The exact amount of organic acid needed to adjust the pH of the mixture to the desired level in accordance with step (e) can vary, for example, depending on the starting pH of the water and the pH of a 34/66 w/w gravimetric mixture of the silica powder and water. In general, the amount of organic acid admixed with the mixture to adjust the pH of the mixture to the desired level will be in the range of from about 0.05% by weight to about 0.5% by weight, based on the total weight of the mixture.

The organic acid lowers the pH and allows more silica powder to be added to the mixture in accordance with step (f) as compared to the amount corresponding to the normal threshold value. For example, approximately 50 grams of silica can be added to approximately 50 grams of water to yield a very thin (<100 cP) aqueous suspension. For example, without the organic acid, only approximately 35 grams of silica can be added to approximately 50 grams of water and a thick paste is formed.

For example, while the silica powder is admixed with the mixture, continued stirring or other agitation of the mixture can be carried out to facilitate the mixing process. For example, the entire amount of silica powder provided in accordance with step (c) can be admixed with the mixture in accordance with step (f). For example, the silica powder can be admixed with the mixture in accordance with step (f) in an amount in the range of from about 35% by weight to about 75% by weight, based on the total amount of the mixture. For example, the silica powder can be admixed with the mixture in accordance with step (f) in an amount in the range of from about 40% by weight to about 60% by weight, based on the total amount of the mixture. For example, the silica powder can be admixed with the mixture in accordance with step (f) in an amount in the range of from about 45% by weight to about 55% by weight, based on the total amount of the mixture.

For example, the silica powder can be admixed with the mixture in an amount sufficient to impart at least about 40% by weight solids to the mixture. For example, the silica powder can be admixed with the mixture in an amount sufficient to impart at least about 50% by weight solids to the mixture. For example, the silica powder can be admixed with the mixture in an amount sufficient to impart at least about 70% by weight solids to the mixture. Suspending aids are generally not needed to achieve the desired solids content.

For example, the silica powder admixed with the mixture in accordance with step (f) can have a specific gravity in the range of from of about 2.2 to about 2.4. For example, the silica powder admixed with the mixture in accordance with step (c) can have a specific gravity in the range of from of about 2.25 to about 2.35.

For example, the silica powder admixed with the mixture in accordance with step (f) can have a bulk density in the range of from about 15 lb/ft$^3$ to about 25 lb/ft$^3$. For example, the silica powder admixed with the mixture in accordance with step (f) can have a bulk density in the range of from about 18 lb/ft$^3$ to about 22 lb/ft$^3$.

As stated above, a silica powder having a water requirement that falls in a specified range at a pH in a specified range means a silica powder having a water requirement that falls within the specified range when 25 grams of the silica powder is mixed with 50 grams of water to fix n a 34/66 w/w mixture of the silica powder and water, and the pH of the mixture is in the specified range. For example, a silica powder can be tested to determine if it has such a water requirement by first measuring the water requirement of the silica powder to make sure it falls in the specified range (for example, a range of from about 80 to about 250). Next, if the water requirement falls within the specified range, the corresponding pH requirement can be checked by mixing 25 grams of the silica powder with 50 grams of water to form a 34/66 mixture of the silica powder and water, and measuring the pH of the mixture to make sure it is in the specified range (for example, a range of about 5.5 to about 7.5).

For example, the silica powder provided in accordance with step (c) can have a water requirement of about 120 to about 250 at a pH in the range of about 5.5 to about 7.5. For example, the silica powder admixed with the mixture in accordance with step (c) can have a water requirement of about 125 to about 150 at a pH in the range of about 5.5 to about 7.5.

For example, the silica powder admixed with the mixture in accordance with step (f) can include undensified silica powder in an amount of at least about 75% by weight, based on the total weight of the silica powder. For example, the silica powder admixed with the mixture in accordance with step (f) can include undensified silica powder in an amount of at least about 90% by weight, based on the total weight of the silica powder. For example, the silica powder admixed with the mixture in accordance with step (f) can consist essentially of undensified silica powder. For example, the silica powder admixed with the mixture in accordance with step (f) can consist of undensified silica powder. Undensified silica powder absorbs water and has a small particle size and high specific surface area. It typically provides a high compressive strength to cement compositions due to its high reactivity and controlled hydrogen bonding. As used in connection with the present method, undensified silica powder helps form low rheology stable suspensions.

A variety of sources of silica powder can be used to provide silica powder in accordance with step (c) that has the parameters set forth in step (c). For example, the silica powder provided in accordance with step (c) can be amorphous fumed silica powder. For example, the amorphous fumed silica powder can be associated with crystalline impurities (e.g., having associated crystalline content). For example, the amorphous fumed silica powder can be pure amorphous silica fume powder. Amorphous fumed silica powder is commercially and readily available. Various sources of amorphous silica fume can be used. For example, the amorphous fumed silica powder can have a particle size in the range of from about 0.1 microns to about 50 microns. For example, the amorphous fumed silica powder can have a particle size in the range of from about 0.1 microns to about 10 microns. For example, the amorphous fumed silica powder can have a particle size in the range of from about 1 micron to about 10 microns.

For example, once the silica powder is admixed with the mixture, stirring or other agitation of the mixture can be continued and the pH of the mixture can be tested. For example, at this point, the pH of the mixture can be in the range of from about 2.3 to about 4.5.

Table I below shows the properties of three different commercially available sources of amorphous fumed silica powder that can be used in connection with the method disclosed herein:

TABLE I

| Silica Source | pH - 50 g water - 25 g silica powder | Water Requirement to mix 100 g of silica powder |
|---|---|---|
| A | 6.5-7.0 | 135 |
| B | 7.0-7.5 | 135 |
| C | 5.5-5.7 | 120 |

For example, while the siliconate is admixed with the mixture, continued stirring or other agitation of the mixture can be carried out to facilitate the mixing process. The siliconate can be added to the mixture in increments in order to achieve the desired pH.

For example, the siliconate admixed with the mixture in accordance with step (g) can be admixed with the mixture in an amount sufficient to adjust the pH of the mixture to a range of from about 6.3 to about 6.5. For example, the siliconate admixed with the mixture in accordance with step (g) can be admixed with the mixture in an amount sufficient to adjust the pH of the mixture to a range of from about 6.3 to about 6.4.

The exact amount of siliconate needed to adjust the pH of the mixture to the desired level in accordance with step (g) can vary, for example, depending on the pH of the mixture before the siliconate is added thereto and the water requirement of the silica powder provided in accordance with step (c). In general, the amount of the siliconate admixed with the mixture to adjust the pH of the mixture to the desired level can be in the range of from about 0.1% by weight to about 0.5% by weight, based on the total weight of the mixture. For example, the amount of the siliconate admixed with the mixture to adjust the pH of the mixture to the desired level can be in the range of from about 0.2% by weight to about 0.4% by weight, based on the total weight of the mixture. For example, the amount of the siliconate admixed with the mixture to adjust the pH of the mixture to the desired level can be in the range of from about 0.25% by weight to about 0.35% by weight, based on the total weight of the mixture.

For example, the siliconate admixed with the mixture in accordance with step (g) can be an alkali metal siliconate. For example, the siliconate admixed with the mixture in accordance with step (g) can be selected from the group consisting of potassium methyl siliconates, potassium methyl silanetriolates, alkane phenyl substituted siliconates, and mixtures thereof. Examples of potassium methyl siliconates include Rhodorsil 51T and Rhoximat Siliconate 51T. An example of an alkane phenyl substituted siliconate is potassium ethyl siliconate. For example, the siliconate admixed with the mixture in accordance with step (g) can be potassium methyl siliconate. The siliconate further reduces the viscosity of the mixture (e.g., to −50 cP) and adjusts the pH to the desired end point value (e.g., 6.0 to 6.8). For example, without the siliconate, gelation and ultimately the formation of a stratified hard gel would occur. The siliconate results in a desired flowability and homogeneity even after several days of storage.

For example, once the siliconate is added to the mixture, continued stirring or other agitation of the mixture can be carried out. The rheology of the mixture can be checked at this point, and again after approximately 30 minutes of continued stirring.

For example, the methods disclosed herein can be carried out as a batch process. For example, the methods disclosed herein can be carried out on a continuous basis.

For example, in some embodiments of the methods disclosed herein, the water, organic acid, silica powder and siliconate can be used in amounts sufficient to form an aqueous silica suspension comprising in the range of from about 30% by weight to about 65% by weight water, in the range of from about 0.05% by weight to about 0.5% by weight of the organic acid, in the range of from about 35% by weight to about 70% by weight of the silica powder, and in the range of from about 0.1% by weight to about 0.5% by weight of the siliconate, the weight percentages being based on the total weight of the aqueous silica suspension. For example, in some embodiments of the methods disclosed herein, the water, organic acid, silica powder and siliconate can be used in amounts sufficient to form an aqueous silica suspension comprising in the range of from about 45% by weight to about 55% by weight water, in the range of from about 0.15% by weight to about 0.3% by weight of the organic acid, in the range of from about 45% by weight to about 55% by weight of the silica powder, and in the range of from about 0.25% by weight to about 0.35% by weight of the siliconate, the weight percentages being based on the total weight of the suspension.

The Aqueous Silica Suspension

An example of an aqueous silica suspension disclosed herein comprises:
(a) water;
(b) an organic acid;
(c) a silica powder, wherein the silica powder includes undensified silica powder in an amount of at least about 50% by weight, based on the total weight of the silica powder, and has a specific gravity in the range of from about 2.1 to about 2.5, a bulk density in the range of from about 12 lb/ft$^3$ to about 40 lb/ft$^3$, and a water requirement of about 80 to about 250 at a pH in the range of about 5.5 to about 7.5; and
(d) a siliconate.

The method by which the aqueous silica suspension is formed is not critical.

For example, the water of the aqueous silica suspension can come from a variety of sources. For example, the water can be fresh water. For example, the water can be salt-containing water. Examples of salt-containing water include saltwater, brine (for example, saturated saltwater or produced water), seawater, brackish water, produced water (for example, water produced from a subterranean formation), formation water, treated flowback water, and any combination thereof. For example, at the time the water is provided, the pH of the water can be tested. At this point, the water will typically have a pH in the range of 7.0 to 7.5.

A suitable organic acid may be used. For example, the organic acid of the aqueous silica suspension can comprise an organic acid that is selected from the group consisting of glycolic acid, gluconic acid, tartaric acid, malic acid, itaconic acid, oxalic acid, succinic acid, adipic acid, sulfosalicylic acid, and combinations thereof. For example, the organic acid of the aqueous silica suspension can comprise an organic acid that is selected from the group consisting of oxalic acid, glycolic acid, malic acid, succinic acid, and combinations thereof. For example, the organic acid can be oxalic acid.

For example, the amount of organic acid in the aqueous silica suspension can be in the range of from about 0.05% by weight to about 0.5% by weight, based on the total weight of the suspension. For example, the amount of organic acid in the aqueous silica suspension can be in the range of from about 0.1% by weight to about 0.4% by weight, based on the total weight of the suspension. For example, the amount of organic acid in the aqueous silica suspension can be in the range of from about 0.25% by weight to about 35% by weight, based on the total weight of the suspension.

For example, the silica powder can be present in the aqueous silica suspension in an amount in the range of from about 35% by weight to about 70% by weight, based on the total amount of the suspension. For example, the silica powder can be present in the aqueous silica suspension in an amount in the range of from about 40% by weight to about 60% by weight, based on the total amount of the suspension.

For example, the silica powder can be present in the aqueous silica suspension in an amount in the range of from about 45% by weight to about 55% by weight, based on the total amount of the suspension.

For example, the silica powder can be present in the aqueous silica suspension in an amount sufficient to impart at least about 40% by weight solids to the suspension. For example, the silica powder can be present in the aqueous silica suspension in an amount sufficient to impart at least about 50% by weight solids to the suspension. For example, the silica powder can be present in the aqueous silica suspension in an amount sufficient to impart at least about 70% by weight solids to the suspension.

For example, the silica powder of the aqueous silica suspension can have a specific gravity in the range of from of about 2.2 to about 2.4. For example, the silica powder of the aqueous silica suspension can have a specific gravity in the range of from of about 2.25 to about 2.35. For example, the silica powder of the aqueous silica suspension can have a bulk density in the range of from about 15 lb/ft$^3$ to about 25 lb/ft$^3$. For example, the silica powder of the aqueous silica suspension can have a bulk density in the range of from about 18 lb/ft$^3$ to about 22 lb/ft$^3$. For example, the silica powder of the aqueous silica suspension can have a water requirement of about 120 to about 250 at a pH in the range of about 5.5 to about 7.5. For example, the silica powder admixed with the mixture in accordance with step (c) can have a water requirement of about 125 to about 150 at a pH in the range of about 5.5 to about 7.5.

For example, the silica powder of the aqueous silica suspension can include undensified silica powder in an amount of at least about 75% by weight, based on the total weight of the silica powder. For example, the silica powder of the aqueous silica suspension can include undensified silica powder in an amount of at least about 90% by weight, based on the total weight of the silica powder. For example, the silica powder of the aqueous silica suspension can consist essentially of undensified silica powder. For example, the silica powder of the aqueous silica suspension can consist of undensified silica powder.

A variety of sources of silica powder can be used to provide the silica powder of the aqueous silica suspension. For example, the silica powder of the aqueous silica suspension can be amorphous fumed silica powder. For example, the amorphous fumed silica powder can be associated with crystalline impurities (e.g., having associated crystalline content). For example, the amorphous fumed silica powder can be pure amorphous fumed silica powder. Various sources of amorphous silica fume can be used. For example, the amorphous fumed silica powder can have a particle size in the range of from about 0.1 microns to about 50 microns. For example, the amorphous fumed silica powder can have a particle size in the range of from about 0.1 microns to about 10 microns. For example, the amorphous fumed silica powder can have a particle size in the range of from about 1 micron to about 10 microns.

Table 1 above shows the properties of three different commercially available sources of amorphous fumed silica powder that can be used as the silica powder of the aqueous silica suspension.

For example, the amount of the siliconate present in the aqueous silica suspension can be in the range of from about 0.1% by weight to about 0.5% by weight, based on the total weight of the mixture. For example, the amount of the siliconate present in the aqueous silica suspension can be in the range of from about 0.2% by weight to about 0.4% by weight, based on the total weight of the mixture. For example, the amount of the siliconate present in the aqueous silica suspension can be in the range of from about 0.25% by weight to about 0.35% by weight, based on the total weight of the mixture.

For example, the siliconate of the aqueous silica suspension can be an alkali metal siliconate. For example, the siliconate of the aqueous silica suspension can a siliconate that is selected from the group consisting of potassium methyl siliconates, potassium methyl silanetriolates, alkane phenyl substituted siliconates, and mixtures thereof. Examples of potassium methyl siliconates include Rhodorsil 51T and Rhoximat Siliconate 51T. An example of an alkane phenyl substituted siliconate is potassium ethyl siliconate. For example, the siliconate of the aqueous silica suspension can be potassium methyl siliconate.

For example, in one embodiment, the aqueous silica suspension can comprise in the range of from about 30% by weight to about 65% by weight water, in the range of from about 0.05% by weight to about 0.5% by weight of the organic acid, in the range of from about 35% by weight to about 70% by weight of the silica powder, and in the range of from about 0.01% by weight to about 1% by weight of the siliconate, the weight percentages being based on the total weight of the suspension. For example, in another embodiment, the aqueous silica suspension can comprise in the range of from about 45% by weight to about 55% by weight water, in the range of from about 0.15% by weight to about 0.3% by weight of the organic acid, in the range of from about 45% by weight to about 55% by weight of the silica powder, and in the range of from about 0.25% by weight to about 0.35% by weight of the siliconate, the weight percentages being the gravimetric concentrations of the components in the suspension.

In certain embodiments, the aqueous silica suspension disclosed herein is the aqueous silica suspension formed by the method of forming an aqueous silica suspension disclosed herein and described above.

The Hydraulic Cement Composition

An example of a hydraulic cement composition for use in a well disclosed herein comprises:
(a) a hydraulic cement;
(b) water; and
(c) an aqueous silica suspension.

As set forth above, as used herein, the term "cement composition" encompasses pastes (or slurries), mortars, grouts (e.g., oil well cementing grouts), shotcrete, and concrete compositions including a hydraulic cement binder.

For example, the water of the hydraulic cement composition can be selected from the group consisting of fresh water, unsaturated salt solutions and saturated salt solutions. For example, the water of the hydraulic cement composition can be fresh water. For example, the water of the hydraulic cement composition can be present in the composition in an amount in the range of from about 10% by weight to about 400% by weight based on the weight of the hydraulic cement in the composition. For example, the water of the hydraulic cement composition can be present in the composition in an amount in the range of from about 60% by weight to about 250% by weight based on the weight of the hydraulic cement in the composition.

The hydraulic cement of the hydraulic cement composition disclosed herein can include calcium, aluminum, silicon, oxygen, and/or sulfur that sets and hardens by reaction with the water. As stated above, as used herein, the term "cement composition" encompasses pastes (or slurries), mortars, grouts (e.g., oil well cementing grouts), shotcrete, and concrete compositions including a hydraulic cement binder. The terms "paste," "mortar," and "concrete" are terms of art: "pastes" are mixtures composed of a hydratable (or hydraulic) cement binder (usually, but not exclusively, Portland cement, masonry cement, mortar cement, and/or gypsum, and may also include limestone, hydrated lime, fly ash, granulated blast furnace slag, and silica fume or other materials commonly included in such cements) and water; "mortars" are pastes additionally including fine aggregate (e.g., sand); and "concretes" are mortars additionally including coarse aggregate (e.g., crushed rock or gravel). The cement compositions described herein may be formed by mixing required amounts of certain materials (e.g., a hydraulic cement, water, and fine and/or coarse aggregate) as may be required for making a particular cementitious composition.

Examples of hydraulic cements may include, but are not limited to, Portland cements (e.g., Classes A, C, G, and H Portland cements), pozzolana cements, gypsum cements, phosphate cements, high alumina content cements, silica cements, high alkalinity cements, and combinations thereof. Cements including shale, cement kiln dust, or blast furnace slag also may be suitable for use in some embodiments described herein. In certain embodiments, the shale may include vitrified shale. In certain other embodiments, the shale may include raw shale (e.g., unfired shale), or a mixture of raw shale and vitrified shale.

For example, the hydraulic cement of the hydraulic cement composition can be selected from the group consisting of Portland cements, slag cements, pozzolana cements, gypsum cements, aluminous cements and silica cements. For example, the hydraulic cement of the hydraulic cement composition can be Portland cement. For example, the hydraulic cement of the hydraulic cement composition can be Class G Portland Cement.

As understood by those skilled in the art with the benefit of this disclosure, additional components can also be included in the hydraulic cement compositions disclosed herein, for example, additional blend materials, filler materials, dispersants, oxidizing agents, solvents, strength stabilizing agents, fluid loss control additives, suspending aids, free-water control agents, retarders, accelerators, expansion additives, viscosifiers, gas migration additives and mechanical property enhancers.

Examples of additional blend materials that can be used include pozzolanas and naturally occurring and/or process by-products such as diatomaceous earth, pumice, perlite, metakaolin, flyash, bio-ash, powder silica fume, silica flour, silica sand, slag, and trass. Examples of filler materials that can be used include metal oxide ores, hematite, manganese oxide, ilmenite, barite, ground marble, hollow glass spheres, elastomeric materials, fibers, flakes, granular materials such as graphite, and nut shells.

The aqueous silica suspension of the hydraulic cement composition is the aqueous silica suspension provided herein and described above.

For example, the aqueous silica suspension can be present in the hydraulic cement composition in an amount in the range of from about 5% by weight to about 800% by weight based on the weight of the hydraulic cement in the composition. For example, the aqueous silica suspension can be present in the hydraulic cement composition in an amount in the range of from about 10% by weight to about 500% by weight based on the weight of the hydraulic cement in the composition. For example, the aqueous silica suspension can be present in the hydraulic cement composition in an amount in the range of from about 15% by weight to about 250% by weight based on the weight of the hydraulic cement in the composition.

The Method of Cementing in a Well

An example of a method of cementing in a well disclosed herein comprises:
(a) providing a hydraulic cement composition; and
(b) placing the cement composition in the well.
The hydraulic cement composition is the hydraulic cement composition disclosed herein and described above.

For example, prior to placing the cement composition in the well, well operations can be ceased, and the method can further comprise: (c) allowing the cement composition to set before well operations are resumed.

As understood by those skilled in the art and set forth above, the term "set" means an increase in mechanical strength of a hydraulic cement composition sufficient to perform a desired result, such as to restrict movement of an item or impede fluid flow or pressure transfer through a fluid. In most instances, the cement composition may be referred to as set when it has cured to a fully solid composition. In some instances, the cement composition may be referred to as set when it can restrict the movement of a pipe, or impede fluid flow or pressure transfer, regardless of whether the cement composition has cured to a fully solid composition. In some instances, a fluid or slurry can be referred to as set when it has thickened to a sufficient level that it achieves the desired result, such as the isolation of a particular zone or the restriction of fluid flow or pressure transfer, regardless of whether it has reached its final consistency.

For example, a method of cementing in a well disclosed herein can be a method of cementing a pipe string in a wellbore, and the cement composition can be placed in the well in a manner that forms a column of cement around the pipe string in the wellbore. For example, the methods disclosed herein can each be a primary cementing operation, and the pipe string can be a casing being cemented in place in the well.

The methods of forming an aqueous silica suspension disclosed herein can be carried out on a wellsite or in relatively close proximity thereto, for example, at a satellite mix station placed to cater to the business needs in the area. There is no need to warehouse or otherwise store the suspensions or transport them over long distances. As a result, relatively freshly prepared, stable silica suspensions can be provided for use, thereby substantially reducing or eliminating the problems of phase separation and sedimentation associated with typical commercially available silica suspensions. In addition, the high handling costs associated with the use of silica suspensions prepared at a remote location are reduced.

In accordance with the methods of forming an aqueous silica suspension disclosed herein, silica suspensions that are tailored for particular applications can be prepared. For example, based on the reactivity of the applicable minerals, chemicals, and additives and the known or estimated geology of the formation, the properties of the silica suspension (e.g., the source of silica powder, percent of solids and silica content) can be tailored to enhance the ability of a hydraulic cement composition to form a predictable cement slurry or sheath with predetermined parameters (e.g., set time, heat of hydration, compressive strength, tensile strength, and pumpability) in the formation.

An aqueous silica suspension formed by a method disclosed herein, and an aqueous silica suspension disclosed herein, can be used in any type of well fluid. The aqueous silica suspensions effectively enhance the strength of and control the free water associated with a hydraulic cement composition. The aqueous silica suspensions are polymer-free (and therefore biocide free) and therefore mitigate against the effects of polymer statistical variance on performance during the product life cycle. Due to the ingredients used, there is no food for allowing micro-organisms to thrive. As a result, the suspensions have a greater shelf life and are offshore friendly. Typically, no stratification or gelation occurs under static conditions. The suspensions have a low rheology. Higher silica loading can be achieved. Fillers are typically not needed.

Unless otherwise indicated, all numbers expressing quantities of ingredients, properties such as molecular weight, reaction conditions, and so forth used in the present specification and associated claims are to be understood as being modified in all instances by the term "about." Accordingly, unless indicated to the contrary, the numerical parameters set forth in the following specification and attached claims are approximations that may vary depending upon the desired properties sought to be obtained by the embodiments described herein. At the very least, and not as an attempt to limit the application of the doctrine of equivalents to the scope of the claim, each numerical parameter should at least be construed in light of the number of reported significant digits and by applying ordinary rounding techniques. It should be noted that when "about" is at the beginning of a numerical list, "about" modifies each number of the numerical list. Further, in some numerical listings of ranges, some lower limits listed may be greater than some upper limits listed. One skilled in the art will recognize that the selected subset will require the selection of an upper limit in excess of the selected lower limit.

The exemplary binder compositions disclosed herein may directly or indirectly affect one or more components or pieces of equipment associated with the preparation, delivery, recapture, recycling, reuse, and/or disposal of the disclosed binder compositions. For example, the disclosed binder compositions may directly or indirectly affect one or more mixers, related mixing equipment, mud pits, storage facilities or units, composition separators, heat exchangers, sensors, gauges, pumps, compressors, and the like used to generate, store, monitor, regulate, and/or recondition the exemplary binder compositions. The disclosed binder compositions may also directly or indirectly affect any transport or delivery equipment used to convey the binder compositions to a well site or downhole such as, for example, any transport vessels, conduits, pipelines, trucks, tubulars, and/or pipes used to compositionally move the binder compositions from one location to another, any pumps, compressors, or motors (e.g., topside or downhole) used to drive the binder compositions into motion, any valves or related joints used to regulate the pressure or flow rate of the binder compositions, and any sensors (i.e., pressure and temperature), gauges, and/or combinations thereof, and the like. The disclosed binder compositions may also directly or indirectly affect the various downhole equipment and tools that may come into contact with the cement compositions/additives such as, but not limited to, wellbore casing, wellbore liner, completion string, insert strings, drill string, coiled tubing, slickline, wireline, drill pipe, drill collars, mud motors, downhole motors and/or pumps, cement pumps, surface-mounted motors and/or pumps, centralizers, turbolizers, scratchers, floats (e.g., shoes, collars, valves, etc.), logging tools and related telemetry equipment, actuators (e.g., electromechanical devices, hydromechanical devices, etc.), sliding sleeves, production sleeves, plugs, screens, filters, flow control devices (e.g., inflow control devices, autonomous inflow control devices, outflow control devices, etc.), couplings (e.g., electro-hydraulic wet connect, dry connect, inductive coupler, etc.), control lines (e.g., electrical, fiber optic, hydraulic, etc.), surveillance lines, drill bits and reamers, sensors or distributed sensors, downhole heat exchangers, valves and corresponding actuation devices, tool seals, packers, cement plugs, bridge plugs, and other wellbore isolation devices, or components, and the like.

Referring now to FIG. 1, a system that may be used in the preparation of a cement composition in accordance with example embodiments will now be described. FIG. 1 illustrates a system 2 for preparation of a cement composition and delivery to a wellbore in accordance with certain embodiments. As shown, the cement composition may be mixed in mixing equipment 4, such as a jet mixer, re-circulating mixer, or a batch mixer, for example, and then pumped via pumping equipment 6 to the wellbore. In some embodiments, the mixing equipment 4 and the pumping equipment 6 may be disposed on one or more cement trucks as will be apparent to those of ordinary skill in the art. In some embodiments, a jet mixer may be used, for example, to continuously mix the composition, including water, as it is being pumped to the wellbore.

Figure 2A:
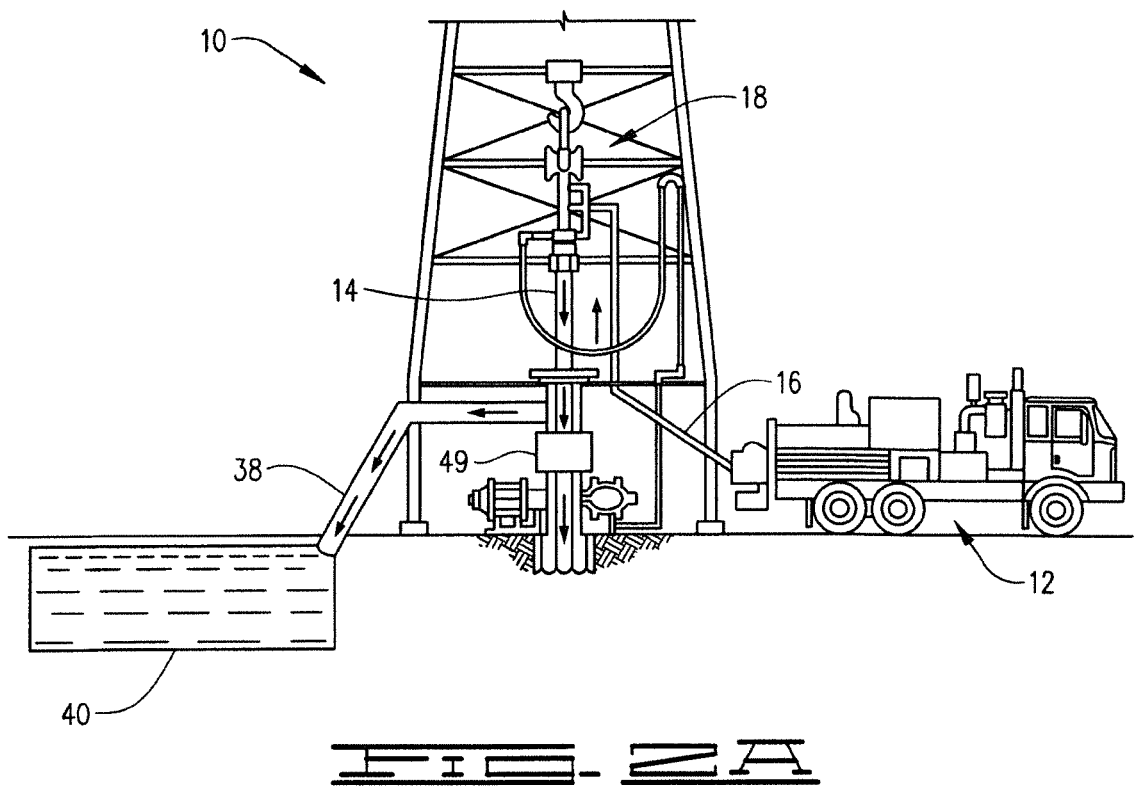
FIG. 2A illustrates surface equipment that may be used in placement of a cement composition in a wellbore in accordance with aspects of the present disclosure.

An example technique and system for placing a cement composition into a subterranean formation will now be described with reference to FIGS. 2A and 2B. FIG. 2A illustrates surface equipment 10 that may be used in placement of a cement composition in accordance with certain embodiments. It should be noted that while FIG. 2A generally depicts a land-based operation, those skilled in the art will readily recognize that the principles described herein are equally applicable to subsea operations that employ floating or sea-based platforms and rigs, without departing from the scope of the disclosure. As illustrated by FIG. 2A, the surface equipment 10 may include a cementing unit 12, which may include one or more cement trucks. The cementing unit 12 may include mixing equipment 4 and pumping equipment 6 (e.g., FIG. 1) as will be apparent to those of ordinary skill in the art. The cementing unit 12 may pump a cement composition 14 through a feed pipe 16 and to a cementing head 18 which conveys the cement composition 14 downhole.

Figure 2B:
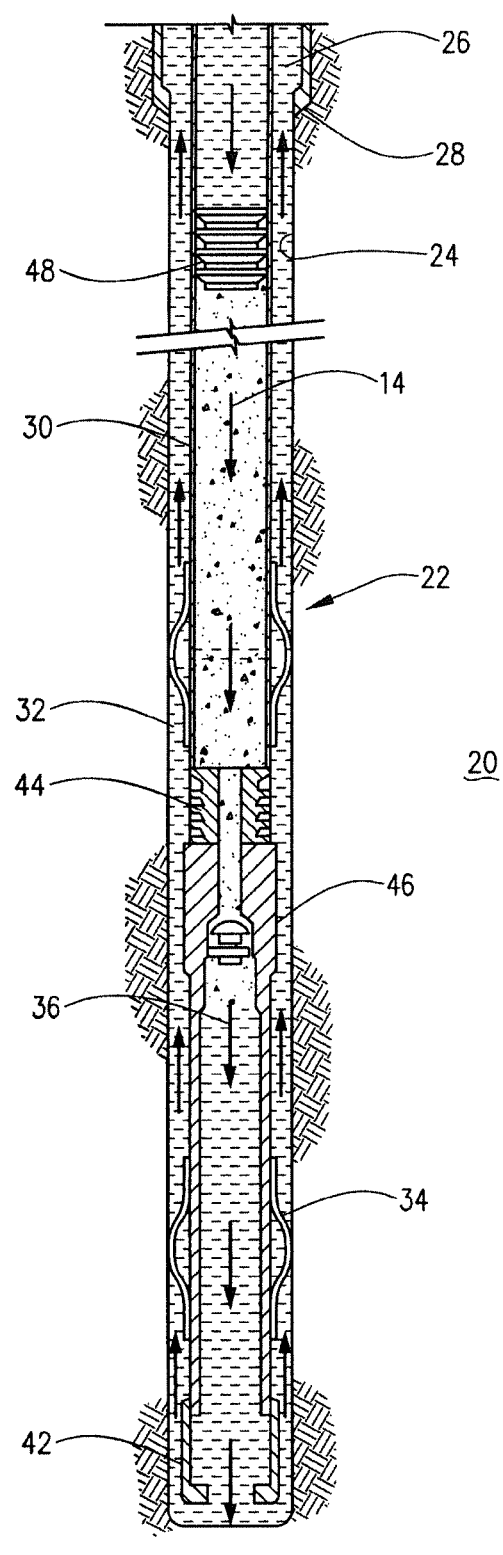
FIG. 2B illustrates placement of a cement composition into a wellbore annulus in accordance with aspects of the present disclosure.

Turning now to FIG. 2B, the cement composition 14 may be placed into a subterranean formation 20 in accordance with example embodiments. As illustrated, a wellbore 22 may be drilled into the subterranean formation 20. While wellbore 22 is shown extending generally vertically into the subterranean formation 20, the principles described herein are also applicable to wellbores that extend at an angle through the subterranean formation 20, such as horizontal and slanted wellbores. As illustrated, the wellbore 22 comprises walls 24. In the illustrated embodiments, a surface casing 26 has been inserted into the wellbore 22. The surface casing 26 may be cemented to the walls 24 of the wellbore 22 by cement sheath 28. In the illustrated embodiment, one or more additional conduits (e.g., intermediate casing, production casing, liners, etc.) shown here as casing 30 may also be disposed in the wellbore 22. As illustrated, there is a wellbore annulus 32 formed between the casing 30 and the walls 24 of the wellbore 22 and/or the surface casing 26. One or more centralizers 34 may be attached to the casing 30, for example, to centralize the casing 30 in the wellbore 22 prior to and during the cementing operation.

With continued reference to FIG. 2B, the cement composition 14 may be pumped down the interior of the casing 30. The cement composition 14 may be allowed to flow down the interior of the casing 30 through the casing shoe 42 at the bottom of the casing 30 and up around the casing 30 into the wellbore annulus 32. The cement composition 14 may be allowed to set in the wellbore annulus 32, for example, to form a cement sheath that supports and positions the casing 30 in the wellbore 22. While not illustrated, other techniques may also be utilized for introduction of the cement composition 14. By way of example, reverse circulation techniques may be used that include introducing the cement composition 14 into the subterranean formation 20 by way of the wellbore annulus 32 instead of through the casing 30.

As it is introduced, the cement composition 14 may displace other fluids (such as drilling fluids and/or spacer fluids) 36 that may be present in the interior of the casing 30 and/or the wellbore annulus 32. At least a portion of the displaced fluids 36 may exit the wellbore annulus 32 via a flow line 38 and be deposited, for example, in one or more retention pits 40 (e.g., a mud pit), as shown on FIG. 2A. Referring again to FIG. 2B, a bottom plug 44 may be introduced into the wellbore 22 ahead of the cement composition 14, for example, to separate the cement composition 14 from the fluids 36 that may be inside the casing 30 prior to cementing. After the bottom plug 44 reaches the landing collar 46, a diaphragm or other suitable device ruptures to allow the cement composition 14 through the bottom plug 44. In FIG. 2B, the bottom plug 44 is shown on the landing collar 46. In the illustrated embodiment, a top plug 48 may be introduced into the wellbore 22 behind the binder composition 14. The top plug 48 may separate the cement composition 14 from a displacement fluid 50 and also push the cement composition 14 through the bottom plug 44.

EXAMPLES

The following examples illustrate specific embodiments consistent with the present disclosure but do not limit the scope of the disclosure or the appended claims. Concentrations and percentages with respect to a hydraulic cement composition or slurry are percent by weight, based on the weight of hydraulic cement in the composition or slurry ("% BWOC"), unless otherwise indicated.

Example 1

A tailored aqueous silica suspension prepared by a method of forming an aqueous silica suspension disclosed herein (the "TAS") was compared to two commercially available silica suspensions at low and high temperatures. The sonic compressive strength over time of a cement slurry containing the TAS was compared to two cement slurries, each containing a commercially available aqueous silica suspension. All of the cement slurries tested were prepared with 450 g of Class H cement, 167.8 g of the aqueous silica suspension being tested, 48.8 g of a liquid fluid loss control agent, 4.7 g of a liquid dispersant and 264 g of water. The same formulation was tested at 300° F., 150° F. and 100° F. The results are shown by the graphs in FIGS. 3-5.

FIG. 3 plots the sonic compressive strength (psi) of both a hydraulic cement composition prepared with the TAS, and a hydraulic cement composition prepared with a commercially available aqueous silica suspension, over time at 300° F. As shown, as compared to the hydraulic cement composition prepared with the commercially available aqueous silica suspension, the hydraulic cement suspension prepared with the TAS achieved and maintained a significantly higher compressive strength at 300° F. after about 5 hours.

Figure 4:
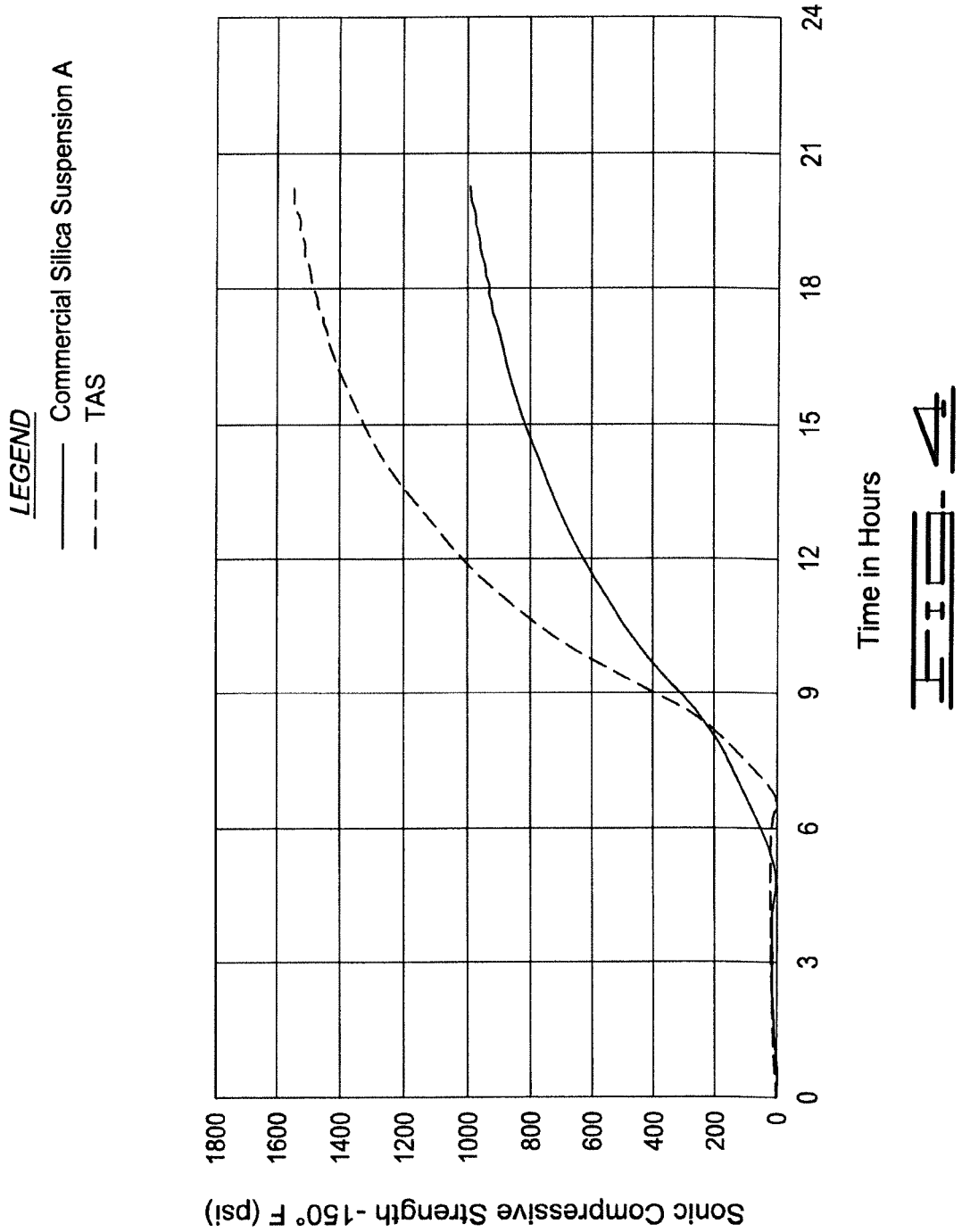
FIG. 4 is a graph showing the sonic compressive strength (psi) of both a hydraulic cement composition prepared with a TAS, and a hydraulic cement composition prepared with a commercially available aqueous silica suspension, over time at 150° F.

FIG. 4 plots the sonic compressive strength (psi) of both a hydraulic cement composition prepared with the TAS, and a hydraulic cement composition prepared with a commercially available aqueous silica suspension, over time at 150° F. As shown, as compared to the hydraulic cement composition prepared with the commercially available aqueous silica suspension, the hydraulic cement suspension prepared with the TAS achieved and maintained a significantly higher compressive strength at 150° F. after about 8 hours.

Figure 5:
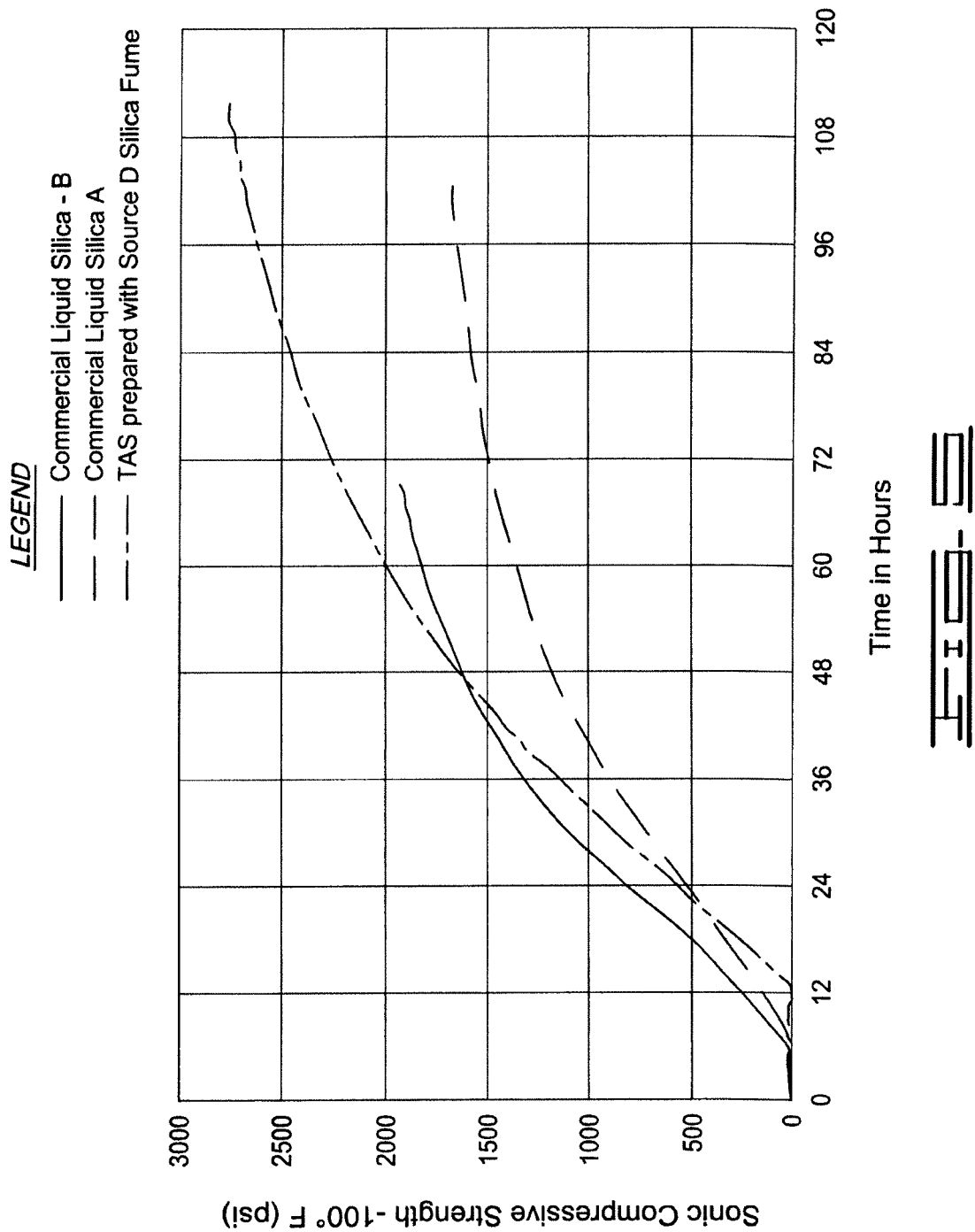
FIG. 5 is a graph comparing the sonic compressive strength (psi) of a hydraulic cement composition prepared with a TAS, and two different hydraulic cement compositions prepared with commercially available aqueous silica suspensions, over time at 100° F.

FIG. 5 compares the sonic compressive strength (psi) of a hydraulic cement composition prepared with the TAS, and two different hydraulic cement compositions prepared with commercially available aqueous silica suspensions, over time at 100° F. As shown, even at 100° F., the TAS outperformed the commercially available aqueous silica suspensions.

Example 2

Next, the impact on the compressive strength of a hydraulic cement composition achieved by three tailored aqueous silica suspensions prepared by a method of forming an aqueous silica suspension disclosed herein was compared to the impact on the compressive strength of a hydraulic cement composition achieved by two commercially available silica suspensions at 100° F. All of the cement slurries tested were prepared with 450 g of Class H cement, 167.8 g of the aqueous silica suspension being tested, 48.8 g of a liquid fluid loss control agent, 4.7 g of a liquid dispersant and 264 g of water. The results are shown by the graph in FIG. 6.

Figure 6:
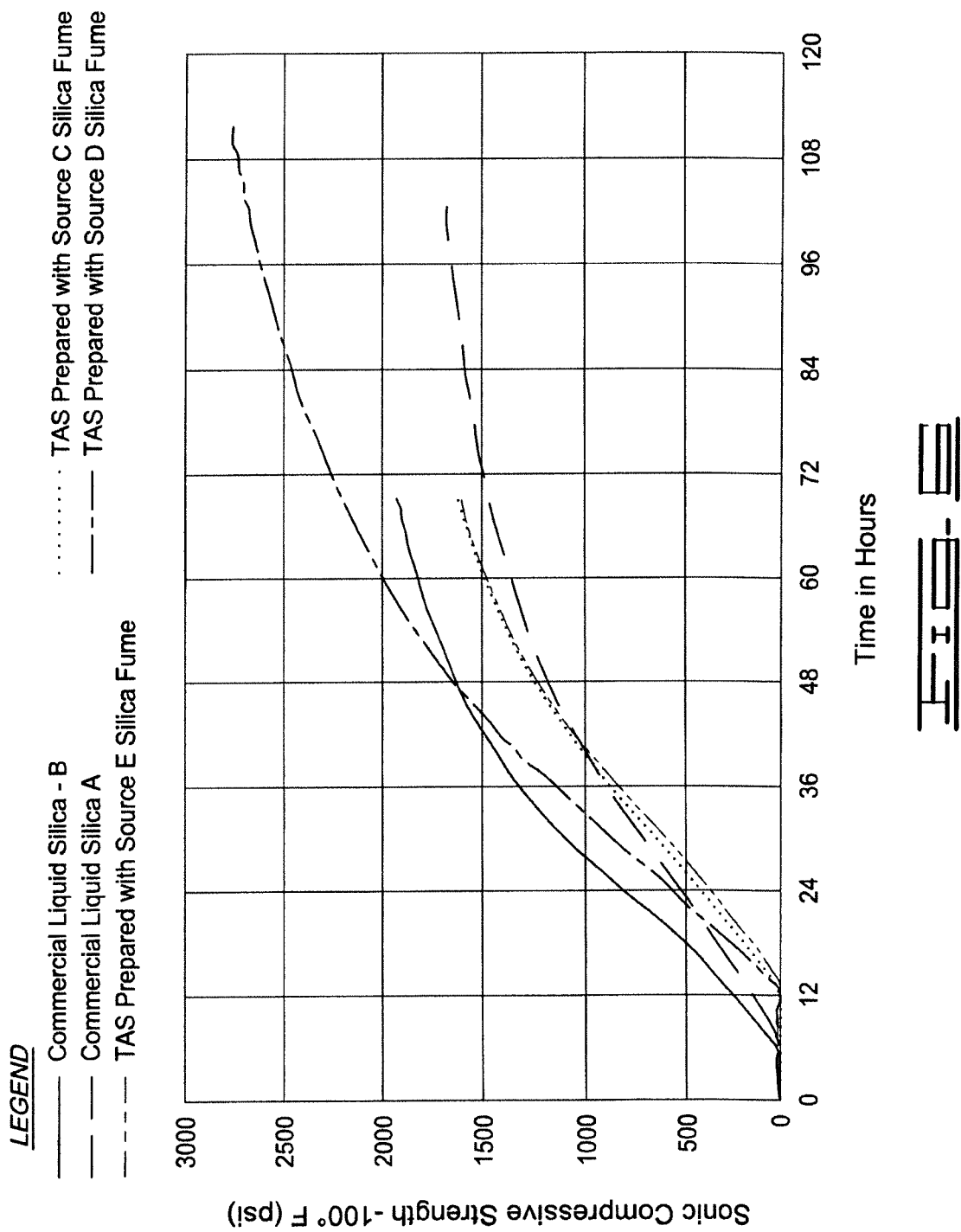
FIG. 6 is a graph comparing the impact on the compressive strength of a hydraulic cement composition achieved by three tailored aqueous silica suspensions prepared by a method of forming an aqueous silica suspension disclosed herein to the impact on the compressive strength of a hydraulic cement composition achieved by two commercially available silica suspensions at 100° F.

As shown, by FIG. 6, regardless of the source of silica fume used, the cement slurries containing aqueous silica suspensions formed by the method of forming an aqueous silica suspension disclosed herein ("TAS with Source C Silica Fume," "TAS with Source D Silica," and "TAS with Source E Silica Fume Fume") overtook one commercially available aqueous silica suspension ("Commercial Liquid Silica B") before 42 hours had elapsed. The TAS with Source D Silica Fume overtook the other commercially available aqueous silica suspension ("Commercial Liquid Silica A") at approximately 20 hours. The TAS with Source D Silica Fume overtook Commercial Liquid Silica B at approximately 48 hours. All the TAS samples developed strength at the same time.

Commercial Liquid Silica A and Commercial Liquid Silica B may have been made using different raw material stocks and different manufacturing process altogether.

Example 3

Next, the surface rheology of each of the aqueous silica suspension samples prepared in Example 2 was tested. The results are shown in Table II below.

TABLE II

Surface Rheologies for all the Samples After Preparation

| RPM | Commercial Liquid Silica B | Commercial Liquid Silica A | TAS - Source C - Silica Fume | TAS - Source D - Silica Fume | TAS - Source E - Silica Fume |
|---|---|---|---|---|---|
| 3 | 0 | 3 | 0 | 1 | 1 |
| 6 | 1 | 10 | 1 | 5 | 5 |
| 30 | 1 | 11 | 2 | 6 | 6 |
| 60 | 1 | 15 | 3 | 9 | 10 |
| 100 | 2 | 22 | 6 | 14 | 13 |
| 200 | 5 | 36 | 11 | 21 | 21 |
| 300 | 7 | 50 | 16 | 30 | 27 |

As shown by Table II, the surface rheology of each of the aqueous silica suspensions prepared in accordance with the method disclosed herein was just as good as (e.g., "in between" "in the range of" or "in bounds of") the surface rheology of each of the commercially available aqueous silica suspensions tested. In connection with the tests, no stratification of settling was seen in connection with any of the samples. No free water was observed in any of the samples.

Therefore, the methods, suspensions and compositions disclosed herein are well adapted to attain the ends and advantages mentioned, as well as those that are inherent therein. The particular examples disclosed above are illustrative only, as the methods, suspensions and compositions disclosed herein may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative examples disclosed above may be altered or modified, and all such variations are considered within the scope and spirit of the methods, suspensions and compositions disclosed herein. While the methods, suspensions and compositions disclosed herein are described in terms of "comprising," "containing," "having," or "including" various components or steps, the compositions and methods can also, in some examples, "consist essentially of" or "consist of" the various components and steps. Whenever a numerical range with a lower limit and an upper limit is disclosed, any number and any included range falling within the range are specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee.

What is claimed is:

1. A method of forming an aqueous silica suspension, comprising:
   (a) providing water;
   (b) providing an organic acid;
   (c) providing a silica powder, wherein said silica powder includes undensified silica powder in an amount of at least about 50% by weight, based on the total weight of the silica powder, and has a specific gravity in the range of from of about 2.1 to about 2.5, a bulk density in the range of from about 12 lb/ft$^3$ to about 40 lb/ft$^3$, and a water requirement in the range of about 80 to about 250 at a pH in the range of about 5.5 to about 7.5;
   (d) providing a siliconate;
   (e) admixing at least a portion of said organic acid with at least a portion of said water to form a mixture, said organic acid being admixed with said water in an amount sufficient to adjust the pH of said mixture to value in the range of about 1.5 to about 3.5;
   (f) after step (e), admixing at least a portion of said silica powder with said mixture; and
   (g) after step (f), admixing at least a portion of said siliconate with said mixture, said siliconate being admixed with said mixture in an amount sufficient to adjust the pH of said mixture to a value in the range of from about 6.0 to about 6.8.

2. The method of claim 1, wherein said organic acid comprises an organic acid that is selected from the group consisting of glycolic acid, gluconic acid, tartaric acid, malic acid, itaconic acid, oxalic acid, succinic acid, adipic acid, sulfosalicylic acid, and combinations thereof.

3. The method of claim 1, wherein said organic acid is admixed with said water in accordance with step (e) in an amount sufficient to adjust the pH of said mixture to a range of about 1.7 to about 2.5.

4. The method of claim 1, wherein said silica powder is admixed with said mixture in connection with step (f) in an amount in the range of from about 35% by weight to about 75% by weight, based on the total weight of said mixture.

5. The method of claim 1, wherein said silica powder is admixed with said mixture in an amount sufficient to impart at least about 40% by weight solids to said mixture.

6. The method of claim 1, wherein said silica powder admixed with said mixture in accordance with step (c) has a specific gravity in the range of from of about 2.2 to about 2.4.

7. The method of claim 1, wherein said silica powder admixed with said mixture in accordance with step (c) has a bulk density in the range of from about 15 lb/ft$^3$ to about 25 lb/ft$^3$.

8. The method of claim 1, wherein said silica powder admixed with said mixture in accordance with step (c) has a water requirement of about 120 to about 250 at a pH in the range of about 5.5 to about 7.5.

9. The method of claim 1, wherein said silica powder includes undensified silica powder in an amount of at least about 75% by weight, based on the total weight of said silica powder.

10. The method of claim 1, wherein said silica powder consists essentially of undensified silica powder.

11. The method of claim 1, wherein said silica powder is amorphous fumed silica powder.

12. The method of claim 11, wherein said fumed silica powder has a particle size in the range of from about 0.1 microns to about 50 microns.

13. The method of claim 1, wherein said siliconate is admixed with said mixture in accordance with step (g) in an amount sufficient to adjust the pH of said mixture to a range of from about 6.3 to about 6.5.

14. The method of claim 1, wherein said siliconate is an alkali metal siliconate.

15. The method of claim 1, wherein said siliconate comprises a siliconate that is selected from the group consisting of potassium methyl siliconates, potassium methyl silanetriolates; alkane phenyl substituted siliconates, and mixtures thereof.

16. The method of claim 13, wherein said siliconate is potassium methyl siliconate.

* * * * *